(12) United States Patent
Ihm et al.

(10) Patent No.: US 7,145,310 B2
(45) Date of Patent: Dec. 5, 2006

(54) METHOD AND SYSTEM FOR CONTROLLING PERMANENT MAGNET SYNCHRONOUS MOTOR

(75) Inventors: Hyung-Bin Ihm, Seoul (KR); Gu-Bae Kang, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/302,109

(22) Filed: Dec. 12, 2005

(65) Prior Publication Data

US 2006/0132082 A1 Jun. 22, 2006

(30) Foreign Application Priority Data

Dec. 20, 2004 (KR) ............... 10-2004-0108864

(51) Int. Cl.
*H02P 1/46* (2006.01)
(52) U.S. Cl. .............. 318/717; 318/807; 318/808; 318/700; 318/712; 318/707
(58) Field of Classification Search .......... 318/717, 318/807, 808, 700, 712, 707, 812, 810, 727, 318/805, 809
See application file for complete search history.

(56) References Cited

U.S. PATENT DOCUMENTS

2002/0043953 A1* 4/2002 Masaki et al. ............ 318/700

2005/0247073 A1* 11/2005 Hikawa et al. ............ 62/228.1

FOREIGN PATENT DOCUMENTS

JP 2002-010686 1/2002

* cited by examiner

*Primary Examiner*—Karen Masih
(74) *Attorney, Agent, or Firm*—Morgan Lewis & Bockius LLP

(57) ABSTRACT

A system for controlling a permanent magnet synchronous motor calculates fundamental a d-axis (or q-axis) voltage command based on a difference between a d-axis (or q-axis) current command and a d-axis (or q-axis) current feedback signal, calculates a harmonic suppression d-axis (or q-axis) voltage command used to suppress at least one higher-order harmonic current component included in a harmonic current component which is calculated based on the differences between the current feedback signals and the current commands, and calculates a d-axis (or q-axis) voltage command by adding the fundamental d-axis (or q-axis) voltage command and the harmonic suppression d-axis (or q-axis) voltage command. The d-axis and q-axis voltage commands are transformed into three-phase voltage commands, which are converted into a drive voltage for driving the permanent magnet synchronous motor. As a result, the harmonic current components are significantly suppressed and the motor's overall performance is improved.

17 Claims, 2 Drawing Sheets

METHOD AND SYSTEM FOR CONTROLLING PERMANENT MAGNET SYNCHRONOUS MOTOR

CROSS-REFERENCE TO RELATED APPLICATIONS

The present application is based on, and claims priority from, Korean Application Serial Number 10-2004-0108864, filed on Dec. 20, 2004 the disclosure of which is hereby incorporated by reference herein in its entirety.

FIELD OF THE INVENTION

The present invention relates to a system and method for controlling the current of a Permanent Magnet Synchronous Motor (PMSM).

BACKGROUND OF THE INVENTION

A permanent magnet synchronous motor is a high-power and high-efficiency motor and it is widely used in the industry for hybrid electric vehicles and the like. The motor's high power and high efficiency at least in part rely on the fact that the permanent magnet synchronous motor has no winding in the rotor thereof and a concentric winding in the stator thereof.

However, there is a significant disadvantage associated with the use of concentric windings. In particular, the concentrated winding causes harmonic current components in a back electromagnetic motive force voltage. For instance, a fifth harmonic current component and/or a seventh harmonic current component, etc., are often found in the back electromagnetic motive force voltage, in addition to a fundamental wave component. These harmonic current components in the back electromagnetic motive force voltage disturb the current control of the permanent magnet synchronous motor by generating a harmonic current that distorts the motor's current waveform. The harmonic current also causes a torque ripple in the motor as well as heat loss from the stator of the motor, thereby reducing the motor's overall efficiency. Although some algorithms have been proposed for suppressing the harmonic current, the complicated calculations required by those algorithms often render them less desirable.

SUMMARY OF THE INVENTION

The present invention is directed to a method and system of controlling a permanent magnet synchronous motor by reducing its torque ripple and suppressing its harmonic current so as to improve its overall performance.

According to some embodiments, a system for controlling a permanent magnet synchronous motor includes a velocity controller for generating a torque command based on a difference between an angular velocity command and a rotor angular velocity calculated based on a rotor absolute angular position of the permanent magnet synchronous motor. A current command generator calculates a q-axis current command and a d-axis current command corresponding to the torque command. A three-phase/d-q coordinate transformer calculates a q-axis current feedback signal and a d-axis current feedback signal based on a drive current, which is applied to the permanent magnet synchronous motor, and the rotor absolute angular position. A current controller calculates a fundamental d-axis voltage command based on a difference between the d-axis current command and the d-axis current feedback signal and a fundamental q-axis voltage command based on a difference between the q-axis current command and the q-axis current feedback signal. The current controller calculates a harmonic suppression d-axis voltage command and a harmonic suppression q-axis voltage command and uses them to suppress at least one higher-order harmonic current component included in a harmonic current component, which is calculated based on a difference between the current feedback signals and the current commands. Next, the current controller calculates a d-axis voltage command by adding the fundamental d-axis voltage command and the harmonic suppression d-axis voltage command and a q-axis voltage command by adding the fundamental q-axis voltage command and the harmonic suppression q-axis voltage command. A d-q/three-phase coordinate transformer transforms the q-axis voltage command and the d-axis voltage command into three-phase voltage commands. An inverter outputs a drive voltage for driving the permanent magnet synchronous motor based on the three-phase voltage commands.

Preferably, the current controller calculates a fifth harmonic suppression d-axis voltage command and a fifth harmonic suppression q-axis voltage command which are used to suppress a fifth harmonic current component in the harmonic current. The current controller calculates a seventh harmonic suppression d-axis voltage command and a seventh harmonic suppression q-axis voltage command which are used to suppress a seventh harmonic current component of the harmonic current component. The current controller calculates the harmonic suppression d-axis voltage command by adding the fifth harmonic suppression d-axis voltage command and the seventh harmonic suppression d-axis voltage command and the harmonic suppression q-axis voltage command by adding the fifth harmonic suppression q-axis voltage command and the seventh harmonic suppression q-axis voltage command.

The current controller transforms the harmonic current component into components in a fifth coordinate system and extracts a direct current component of a fifth harmonic current component by filtering the components using a low pass filter. The current controller calculates a first voltage command for causing the extracted direct current component to be zero using a proportional integration controller and calculates the fifth harmonic suppression d-axis and q-axis voltage commands by transforming the first voltage command into that in a fundamental wave coordinate system.

The current controller transforms the harmonic current component into components in a seventh coordinate system and extracts a direct current component of a seventh harmonic current component by filtering the components using a low pass filter. The current controller calculates a second voltage command for causing the extracted direct current component to be zero using the proportional integration controller and calculates the seventh harmonic suppression d-axis and q-axis voltage commands by transforming the second voltage command into that in the fundamental wave coordinate system.

In some other embodiments, a method for controlling a current of a permanent magnet synchronous motor includes the steps of generating a torque command based on a difference between an angular velocity command and an angular velocity calculated based on a rotor absolute angular position of the permanent magnet synchronous motor; calculating d-axis and q-axis current feedback signals based on a drive current of the permanent magnet synchronous motor and a rotor absolute angular position of the permanent magnet synchronous motor; calculating a fundamental d-axis voltage command based on a difference between a d-axis current command and the d-axis current feedback signal and a fundamental q-axis voltage command based on a difference between a q-axis current command, which is calculated based on the torque command, and the q-axis current feedback signal; calculating a harmonic suppression d-axis voltage command and a harmonic suppression q-axis voltage command which are used to suppress at least one higher-order harmonic current component included in a harmonic current which is calculated based on a difference between the current feedback signal and the current command; calculating a d-axis voltage command by adding the fundamental d-axis voltage command and the harmonic suppression d-axis voltage command and a q-axis voltage command by adding the fundamental q-axis voltage command and the harmonic suppression q-axis voltage command; and transforming the q-axis voltage command and the d-axis voltage command into three-phase voltage commands, and outputting a drive voltage for driving the permanent magnet synchronous motor based on the three-phase voltage commands.

Preferably, the step of calculating the harmonic suppression d-axis voltage command and the harmonic suppression q-axis voltage command includes the steps of calculating a fifth harmonic suppression d-axis voltage command and a fifth harmonic suppression q-axis voltage command which are used to suppress the fifth harmonic current component of the harmonic current component; calculating a seventh harmonic suppression d-axis voltage command and a seventh harmonic suppression q-axis voltage command which are used to suppress a seventh harmonic current component of the harmonic current component; and calculating the harmonic suppression d-axis voltage command by adding the fifth harmonic suppression d-axis voltage command and the seventh harmonic suppression d-axis voltage command and the harmonic suppression q-axis voltage command by adding the fifth harmonic suppression q-axis voltage command and the seventh harmonic suppression q-axis voltage command.

Preferably, the step of calculating the fifth harmonic suppression voltage command includes the steps of transforming the harmonic current component into components in a fifth coordinate system; extracting a direct current component of a fifth harmonic current component by filtering the components in the fifth coordinate system using a low pass filter; and calculating a first voltage command for causing the extracted direct current component to be zero using a proportional integration controller, and calculating the fifth harmonic suppression d-axis and q-axis voltage commands by transforming the first voltage command into that in a fundamental wave coordinate system.

Preferably, the step of calculating the seventh harmonic suppression voltage command includes the steps of transforming the harmonic current components into components in a seventh coordinate system; extracting a direct current component of a seventh harmonic current component by filtering the components in the seventh coordinate system using a low pass filter; and calculating a second voltage command for causing the extracted direct current component to be zero using the proportional integration controller, and calculating the seventh harmonic suppression voltage command by transforming the second voltage command into that in the fundamental wave coordinate system.

BRIEF DESCRIPTION OF THE DRAWINGS

For a better understanding of the nature of the present invention, reference should be made to the following detailed description with the accompanying drawings, in which.

DETAILED DESCRIPTION OF THE EMBODIMENTS

Embodiments of the present invention will be described with reference to the accompanying drawings.

Figure 1:
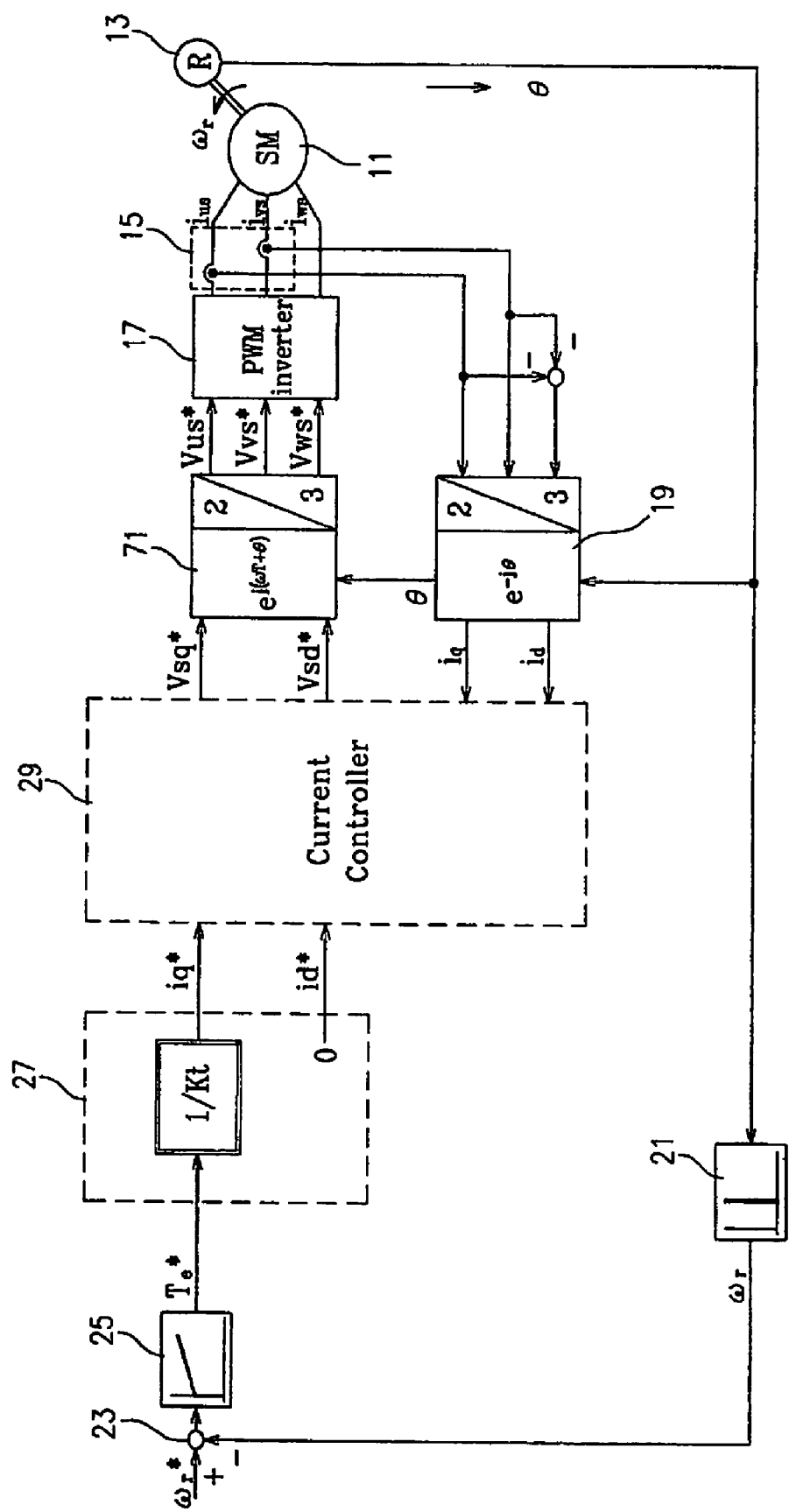
FIG. 1 is a diagram schematically showing a system for controlling a permanent magnet synchronous motor according to some embodiments of the present invention.

In FIG. 1, reference numeral 11 denotes a permanent magnet synchronous motor. For example, the permanent magnet synchronous motor 11 may be an Interior Permanent Magnet Synchronous Motor (IPMSM).

A location detector 13 detects the absolute angular position $\theta$ of the rotor of the permanent magnet synchronous motor 11. The absolute angular position $\theta$ refers to an angular position where a positive d-axis current is applied to the permanent magnet synchronous motor 11. Note that the absolute angular position and the calculation of the absolute angular position are apparent to those skilled in the art and detailed descriptions thereof are therefore omitted. In some embodiments, the position detector 13 may be a resolver. Hereinafter, reference numeral 13 denotes the resolver.

A current detector 15 detects drive currents ius, ivs and iws which are applied to the permanent magnet synchronous motor 11 at the output voltages Vus, Vvs and Vws of a PWM inverter 17.

A three-phase/d-p coordinate transformer 19 transforms a current received from the current detector 15 into a q-axis current feedback signal iq (that is, a torque split current feedback signal) and a d-axis current feedback signal id (that is, a magnetic flux split current feedback signal) using the absolute angular position $\theta$ received from the resolver 13.

An angular velocity calculator 21 calculates an angular velocity $\omega r$ based on the absolute angular position $\theta$ received from the resolver 13. In some embodiments, the angular velocity calculator 21 may include a differentiator. A subtractor 23 calculates the difference between an angular velocity command value $\omega r^*$ and the calculated angular velocity $\omega r$.

A velocity controller 25 receives the angular velocity difference calculated by the subtractor 23, and outputs a torque command Te* corresponding to the angular velocity difference. In some embodiments, the velocity controller 25 may include a Proportional Integration (PI) controller. A current command generator 27 generates a q-axis current command iq* (also referred to as a "torque split current command") corresponding to the torque command Te*. For example, the q-axis current command iq* may be calculated by multiplying the torque command Te* and the inverse of a torque constant Kt. Meanwhile, the current command generator 27 generates a d-axis current command id* (also referred to as a "magnetic flux split current command"). In some embodiments, the d-axis current command is preferably set to 0. Note that the calculations of the q-axis and d-axis current commands are apparent to those skilled in the art and no detailed descriptions thereof are provided herein.

The q-axis and d-axis current commands iq*, id* are input to a current controller 29. The q-axis current feedback signal iq and the d-axis current feedback signal id, which are generated by the three-phase/d-q coordinate transformer 19, are also input to the current controller 29. The current controller 29 generates a q-axis voltage command Vsq* and a d-axis voltage command Vsd* using the q-axis and the d-axis current commands iq* and id* and the q-axis and the d-axis current feedback signals iq and id.

In order to generate the q-axis voltage command Vsq* and the d-axis voltage command Vsd*, the current controller 29 extracts harmonic current components by subtracting the d-axis and the q-axis current commands from the d-axis and the q-axis current feedback signals, converts the extracted harmonic current components into components in the fifth and seventh coordinate systems, and separates the direct current components of the fifth and seventh harmonic current components using a low pass filter. The current controller 29 also generates harmonic suppression voltage commands that cause the fifth and seventh harmonic current components to be zero using a PI controller, inversely transforms the fifth and seventh harmonic offset voltage commands into those in an original fundamental coordinate system and outputs them.

According to some embodiments of the present invention, the current controller 29 generates the harmonic offset voltage commands that are used to eliminate the influence of the harmonic current components based on the harmonic characteristics of the permanent magnet synchronous motor. The harmonic characteristics of the permanent magnet synchronous motor are described below. The operation of the current controller 29 is described in detail below.

The stator voltage equation of the permanent magnet synchronous motor is expressed in Equation (1) using voltage and current space vectors.

$$\bar{v}_s^s = R_s \bar{i}_s^s + \frac{d\Psi_s^s}{dt} \quad (1)$$

where respective physical quantities, and voltage and current vectors are defined as follows:

$\bar{v}_s^s$ is a motor voltage vector,
$L_s$ is a phase inductance,
$R_s$ is a motor phase resistance,
$i_u, i_v, i_w$ are motor u-, v- and w-phase currents,
$\bar{i}_s^s$ is a motor current vector,
$v_u, v_v, v_w$ are motor u-, v- and w-phase voltages,
$\Psi_s^s$ is a magnetic flux linkage vector, and $$\bar{v}_s^s = \frac{2}{3}\left(v_u + v_v e^{j\frac{2}{3}\pi} + v_w e^{-j\frac{2}{3}\pi}\right)$$

$$\bar{i}_s^s = \frac{2}{3}\left(i_u + i_v e^{j\frac{2}{3}\pi} + i_w e^{-j\frac{2}{3}\pi}\right)$$

where superscript "s" designates a variable in a stationary coordinate system.

When a coil linkage flux is divided into a component caused by the stator current and a component caused by the permanent magnet, Equation (1) can be expressed as Equation (2):

$$\bar{v}_s^s = R_s \bar{i}_s^s + \frac{d(L_s \bar{i}_s^s + \Psi_F e^{j\theta})}{dt} \quad (2)$$

where $\psi_F$ is the magnetic flux of the permanent magnet, and $\theta$ is a rotor angular position.

The harmonic of the back electromotive force (emf) voltage of the permanent magnet synchronous motor may be modeled on the harmonic of a void magnetic linkage flux attributable to the permanent magnet. Since a third harmonic is offset and does not exist, the fifth and seventh harmonics are primary components. Therefore, Equation (2) can be expressed as Equation (3) when only the fifth and seventh harmonics are considered (a harmonic of a higher order than the seventh harmonic is ignored because it is insignificant compared with the fifth or seventh harmonic).

$$\bar{v}_s^s = R_s \bar{i}_s^s + \frac{d(L_s \bar{i}_s^s)}{dt} + \frac{d(\Psi_{F1} e^{j\theta} + \Psi_{F5} e^{-j5\theta} + \Psi_{F7} e^{j7\theta})}{dt} \quad (3)$$

where subscript "1" designates a fundamental wave, subscript "5" and "7" designate fifth and seventh components, respectively. As shown in Equation (3), the fifth component rotates in a direction opposite to that of the fundamental wave, and the seventh component rotates in the same direction as the fundamental wave.

Similarly, the harmonic current components can be expressed as:

$$\bar{i}_s^s = \bar{i}_1 e^{j\theta} + \bar{i}_5 e^{-j5\theta} + \bar{i}_7 e^{j7\theta} \quad (4)$$

When Equation (3) and (4) are combined together, and a coordinate transformation into a fundamental wave coordinate system synchronized with the rotor is performed using the following Equation (5), and a harmonic model expressed as the following Equation (6) is acquired.

$$\bar{i}_s = \bar{i}_s^s e^{-j\theta} \quad (5)$$

$$\bar{v}_s = \left(R_s \bar{i}_1 + L_s \frac{d\bar{i}_1}{dt} + j\omega L_s \bar{i}_1 + j\omega \Psi_{F1}\right) + \\ \left(R_s \bar{i}_5 + L_s \frac{d\bar{i}_5}{dt} - j5\omega L_s \bar{i}_5 - j5\omega \Psi_{F5}\right) e^{-j6\theta} + \\ \left(R_s \bar{i}_7 + L_s \frac{d\bar{i}_7}{dt} + j7\omega L_s \bar{i}_7 + j7\omega \Psi_{F7}\right) e^{j6\theta} \quad (6)$$

The first term of Equation (6) designates the dynamic characteristics of the fundamental wave, and the second term and the third term respectively designate the dynamic characteristics of the fifth and seventh components. Furthermore, from Equation (6), it can be understood that the fifth harmonic current component in the synchronous coordinate system is observed as a sixth component in a backward direction and the seventh harmonic current component in the synchronous coordinate system is observed as a sixth component in a forward direction.

Similarly, when the motor current feedback signals shown in Equation (4) are transformed into those in the synchronous coordinate system in Equation (5), a resulting Equation includes a fifth harmonic current component and a seventh harmonic current component. The fifth harmonic current component is observed as a sixth component in a backward direction and the seventh harmonic current component is observed as a sixth component in a forward direction.

In order to control the current of the permanent magnet synchronous motor, both the fifth and seventh harmonic current components should be zero, which may be accomplished by setting the corresponding order current in the corresponding higher-order coordinate system to zero.

Figure 2:
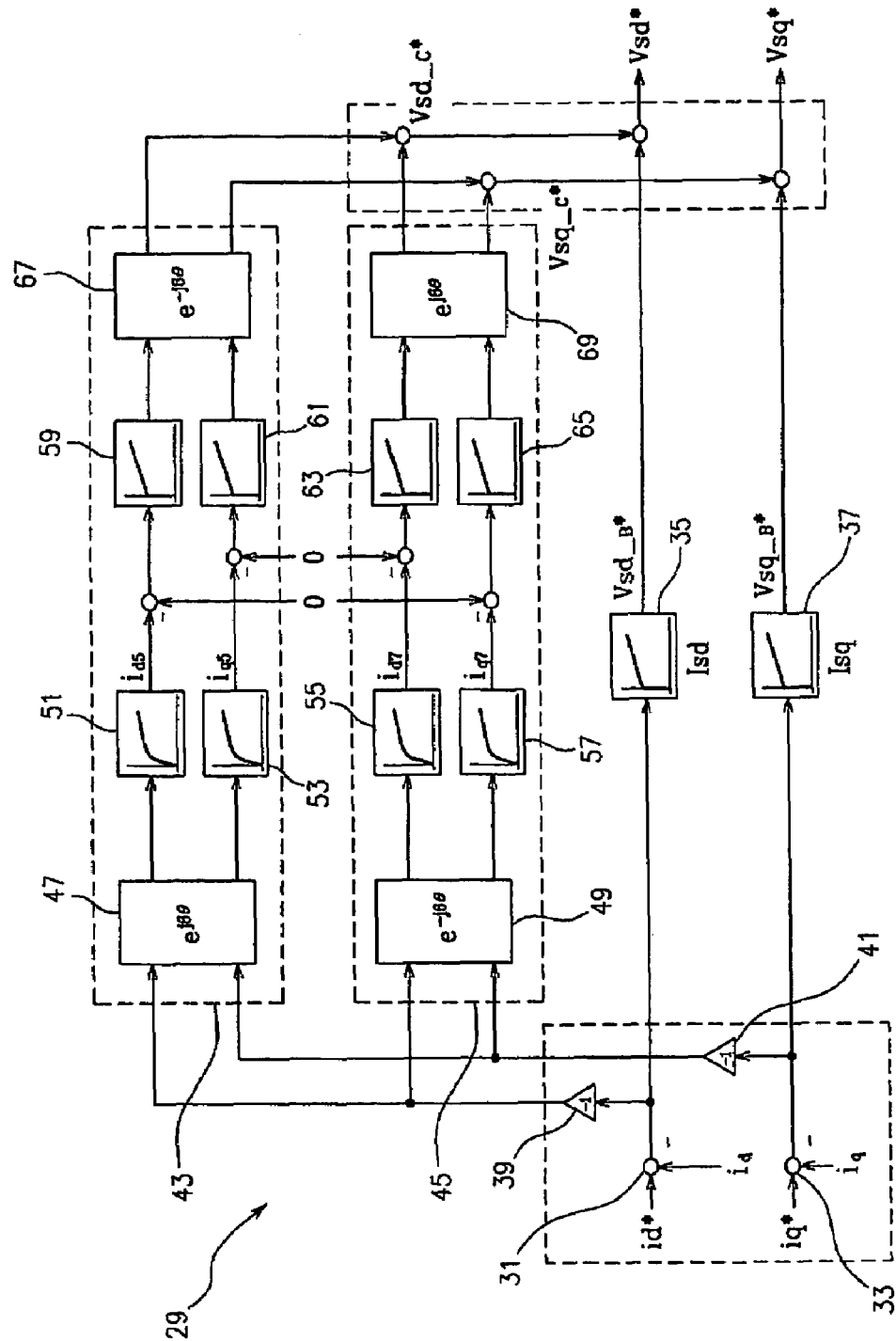
FIG. 2 is a diagram schematically showing the current controller of FIG. 1.

In FIG. 2, the block diagram of a current controller 29 according to some embodiments of the present invention is shown. Specifically, a d-axis current signal subtractor 31 calculates the difference between the d-axis current command id* and the d-axis current feedback signal id provided by the coordinate transformer 19. A q-axis current signal subtractor 33 calculates the difference between the q-axis current command iq* and the q-axis current feedback signal iq.

A fundamental d-axis current controller 35 calculates a fundamental d-axis voltage command Vsd_B* using the difference between the d-axis current command id* and the d-axis current feedback signal id. A fundamental q-axis current controller 37 calculates a fundamental q-axis voltage command Vsq_B* using the difference between the q-axis current command iq* and the q-axis current feedback signal iq. In some embodiments, the fundamental d-axis current controllers 35 and 37 each include a Proportional Integration (PI) controller. The fundamental d-axis voltage command Vsd_B* and the fundamental q-axis voltage command Vsq_B* may be generated in the same manner as the d-axis and q-axis commands Vsq*, Vsd*.

To suppress harmonic current components, a voltage command for suppressing a harmonic is generated using a value acquired by subtracting a current command from a current feedback signal (hereinafter referred to as the "difference between a current feedback signal and a current command"). Therefore, the output values of the d-axis current signal subtractor 31 and the q-axis current signal subtractor 33 each pass through negative gains 39 and 41. As a result, for d-axis and q-axis components, the differences between the current feedback signals and the current commands are generated, and the generated differences between the current feedback signals and the current commands are respectively input to a fifth harmonic controller 43 and a seventh harmonic controller 45.

At this time, as described above, when Equation (4), i.e., the vector equation of a current feedback signal, is transformed into that of a synchronous coordinate system, the fifth harmonic current component, which is observed as the sixth component in backward direction, and the seventh current component, which is observed as the sixth component in a forward direction, are included, as shown in Equation (6). Therefore, the differences between the current feedback signals and the current commands, which are variables in the synchronous coordinate system, also include the fifth harmonic current component, i.e., the sixth component in a backward direction, and the seventh current component, i.e., the sixth component in a forward direction. In other words, the differences between the current feedback signals and the current commands, which are input to the fifth harmonic controller 43 and the seventh harmonic controller 45, include those in both the fifth harmonic current components and the seventh current components.

When a measured motor current equation expressed by Equation (4) is transformed into that in the synchronous coordinate system using Equation (5) and is then transformed into those on fifth and seventh coordinate systems using the following Equations (7) and (8), a fundamental wave component and another harmonic current component other than a harmonic of a corresponding order are observed as the seventh and twelfth alternating current components, as shown in Equations (9) and (10).

$$i_s^{-5} = \bar{i}_s e^{j6\theta} \qquad (7)$$

$$i_s^{-7} = \bar{i}_s e^{-j6\theta} \qquad (8)$$

$$i_s^{-5} = \bar{i}_1 e^{j6\theta} + \bar{i}_5 + \bar{i}_7 e^{j12\theta} \qquad (9)$$

$$i_s^{-7} = \bar{i}_1 e^{-j6\theta} + \bar{i}_5 e^{-j12\theta} + \bar{i}_7 \qquad (10)$$

where subscript s and superscripts −5 and −7 respectively designate variables in a stationary coordinate system, a fifth coordinate system and a seventh coordinate system.

As shown in Equation (9), in the fifth coordinate system, the fifth harmonic current component is observed as a direct current, and the fundamental wave component and the seventh harmonic current component are respectively observed as a sixth alternating current and a twelfth alternating current. Furthermore, as shown in Equation (10), in the seventh coordinate system, the seventh harmonic current component is observed as a direct current, and the fundamental wave component and the fifth harmonic current component are respectively observed as a sixth alternating current and a twelfth alternating current.

Therefore, when the difference between the current feedback signal and the current command, that is, variables in the synchronous coordinate system, is transformed into those in the fifth and seventh coordinate systems using Equations (7) and (8), the fifth component is observed as a direct current, and the fundamental wave component and the seventh component are respectively observed as a sixth alternating current and a twelfth alternating current, in the fifth coordinate system, like Equations (9) and (10). Furthermore, in the seventh coordinate system, the seventh component is observed as a direct current, and the fundamental wave component and the fifth components are respectively observed as a sixth alternating current and a twelfth alternating current. In some embodiments, the differences between the current feedback signals and the current commands are respectively transformed into values in the fifth and seventh coordinate systems using the coordinate transformers 47 and 49.

In other words, when the difference between the current feedback signal and the current command is transformed into that in the fifth coordinate system, the fifth harmonic current component is observed as a direct current component, and the fundamental wave and the seventh harmonic are observed as alternating current components. Meanwhile, when the difference between the current feedback signal and the current command is transformed into that in the seventh coordinate system, the seventh harmonic current component is observed as a direct current component, and the fundamental wave and the fifth harmonic are observed as alternating current components.

By filtering the differences between the current feedback signals and the current commands, which are transformed into those in the fifth coordinate system and the seventh coordinate system, using low pass filters, the alternating current components are offset and only the direct current components are extracted. In other words, the difference between the current feedback signal and the current command, which is transformed into that in the fifth coordinate system, is filtered by a fifth d-axis low pass filter 51 and a fifth q-axis low pass filter 53. As a result, the direct current component $i_{d5}$ of the fifth harmonic d-axis current and the direct current component $i_{q5}$ of the fifth harmonic q-axis current are respectively extracted through filtering using the fifth d-axis low pass filter 51 and the fifth q-axis low pass filter 53. Similarly, the difference between the current feedback signal and the current command, which is transformed into that in the seventh coordinate system, is filtered by a seventh d-axis low pass filter 55 and a seventh q-axis low pass filter 57. The direct current component $i_{d7}$ of the seventh harmonic d-axis current and the direct current component $i_{q7}$ of the seventh harmonic q-axis current are respectively extracted through filtering using the seventh d-axis low pass filter 55 and the seventh q-axis low pass filter 57.

The extracted direct current components of the fifth and seventh d-axis and q-axis currents are compensated for using four independent proportional integration controllers 59, 61, 63 and 65, which cause the current components to be zero. As a result, the harmonic suppression voltage commands in the fifth and seventh coordinate systems, which cause the fifth and seventh harmonic current components to be zero, are acquired.

After that, the harmonic suppression voltage command in the fifth coordinate system and the harmonic suppression voltage command in the seventh coordinate system are respectively inversely transformed into signals in the synchronous coordinate system using Equations (8) and (7). The harmonic suppression voltage command in the fifth coordinate system is transformed into that in the synchronous coordinate system using the coordinate transformer 67 corresponding to Equation (8), and the harmonic suppression voltage command in the seventh coordinate system is transformed into that in the synchronous coordinate system using the coordinate transformer 69 corresponding to Equation (7).

Furthermore, a harmonic suppression d-axis voltage command Vsd_C* is generated by adding the fifth harmonic suppression d-axis voltage command acquired by the coordinate transformer 67 of the fifth harmonic controller 43 and the seventh harmonic suppression d-axis voltage command acquired by the coordinate transformer 69 of the seventh harmonic controller 45. Similarly, a harmonic suppression q-axis voltage command Vsq_C* is generated by adding the fifth harmonic suppression q-axis voltage command acquired by the coordinate transformer 67 of the fifth harmonic controller 43 and the seventh harmonic suppression q-axis voltage command acquired by the coordinate transformer 69 of the seventh harmonic controller 45.

After that, a final d-axis voltage command Vsd* is generated by adding the fundamental d-axis voltage command Vsd_B* calculated by the fundamental d-axis current controller 35 and the harmonic suppression d-axis voltage command Vsd_C*. Similarly, a final q-axis voltage command Vsq* is generated by adding the fundamental q-axis voltage command Vsq_B* calculated by the fundamental q-axis current controller 37 and the harmonic suppression q-axis voltage command Vsq_C*.

Since final d-axis and q-axis voltage commands Vsd*, Vsq* include the command for suppression of harmonic caused by back electromotive force attributable to the non-uniformity of the flux of the permanent magnet of the permanent magnet synchronous motor, the harmonic current components are considerably decreased in the stator current. As a result, the torque ripples attributable to the harmonic current components are also decreased and the overall efficiency of the permanent magnet synchronous motor is significantly improved.

The d-axis voltage command Vsd* and the q-axis voltage command Vsq* calculated by the current controller 29 in the above-described manner are input to a d-q/three-phase coordinate transformer 71. The d-q/three-phase coordinate transformer 71 transforms the d-axis voltage command Vsd* and the q-axis voltage command Vsq* into three-phase voltage commands Vus* and Vvs* and Vws* using an absolute angular position θ. The PWM inverter 17 modulates the three-phase voltage commands Vus* and Vvs* and Vws* using pulse width modulation and applies the output voltages Vus and Vvs and Vws to the permanent magnet synchronous motor 11. Therefore, the permanent magnet synchronous motor 11 is driven by drive currents Ius and Ivs and Iws applied to the permanent magnet synchronous motor 11. The operations of the d-q/three phase coordinate transformer 71 and the PWM inverter 17 are apparent to those skilled in the art and no descriptions thereof are included herein.

In sum, harmonic currents attributable to the non-uniformity of the flux of the permanent magnet are efficiently suppressed by performing a plurality of independent current controls in higher-order coordinate systems synchronized with harmonics of respective orders.

Note that the aforementioned embodiments of the present invention have been disclosed for illustrative purposes. Those skilled in the art will appreciate that various modifications, additions and substitutions are possible, without departing from the scope and spirit of the invention as disclosed in the accompanying claims.

What is claimed is:

1. A system for controlling a permanent magnet synchronous motor, comprising:

a velocity controller for generating a torque command based on a difference between an angular velocity command and a rotor angular velocity calculated based on a rotor absolute angular position of the permanent magnet synchronous motor;

a current command generator for generating a q-axis current command and a d-axis current command corresponding to the torque command;

a three-phase/d-q coordinate transformer for generating a d-axis current feedback signal and a q-axis current feedback signal based on a drive current applied to the permanent magnet synchronous motor and the rotor absolute angular position;

a current controller for generating a fundamental d-axis voltage command and a fundamental q-axis voltage command, a harmonic suppression d-axis voltage command and a harmonic suppression q-axis voltage command which are used to suppress at least one higher-order harmonic current component included in a harmonic current component, and generating a d-axis voltage command by adding the fundamental d-axis voltage command and the harmonic suppression d-axis voltage command and a q-axis voltage command by adding the fundamental q-axis voltage command and the harmonic suppression q-axis voltage command;

a d-q/three phase coordinate transformer for transforming the q-axis voltage command and the d-axis voltage command into three-phase voltage commands; and an inverter for outputting a drive voltage for driving the permanent magnet synchronous motor based on the three-phase voltage commands.

2. The system as set forth in claim 1, wherein the current controller calculates a fifth harmonic suppression d-axis voltage command and a fifth harmonic suppression q-axis voltage command, which are used to suppress a fifth harmonic current component of the harmonic current component, and a seventh harmonic suppression d-axis voltage command and a seventh harmonic suppression q-axis voltage command, which are used to suppress a seventh harmonic current component of the harmonic current component; and the current controller generates the harmonic suppression d-axis voltage command by adding the fifth harmonic suppression d-axis voltage command and the seventh harmonic suppression d-axis voltage command and the harmonic suppression q-axis voltage command by adding the fifth harmonic suppression q-axis voltage command and the seventh harmonic suppression q-axis voltage command.

3. The system as set forth in claim 2, wherein the current controller transforms the harmonic current component into components in a fifth coordinate system, extracts a direct current component of a fifth harmonic current component by filtering the components in the fifth coordinate system using a first low pass filter, calculates a first voltage command for causing the extracted direct current component to be zero using a proportional integration controller, and calculates the fifth harmonic suppression q-axis and d-axis voltage commands by transforming the first voltage command into that in a fundamental wave coordinate system; and the current controller transforms the harmonic current component into components in a seventh coordinate system, extracts a direct current component of a seventh harmonic current component by filtering the components in the seventh coordinate system using a second low pass filter, calculates a second voltage command for causing the extracted direct current component to be zero using the proportional integration controller, and calculates the seventh harmonic suppression q-axis and d-axis voltage commands by transforming the second voltage command into that in the fundamental wave coordinate system.

4. The system as set forth in claim 1, wherein the d-axis current command is zero.

5. The system as set forth in claim 1, wherein the harmonic current component is calculated based on differences between the d-axis and q-axis current feedback signals and the d-axis and q-axis current commands.

6. The system as set forth in claim 1, wherein the fundamental d-axis voltage command is based on a difference between the d-axis current command and the d-axis current feedback signal and the fundamental q-axis voltage command is based on a difference between the q-axis current command and the q-axis current feedback signal.

7. A method for controlling a current of a permanent magnet synchronous motor, comprising:

generating a torque command based on a difference between an angular velocity command and an angular velocity calculated based on a rotor absolute angular position of the permanent magnet synchronous motor;

generating d-axis and q-axis current feedback signals based on a drive current of the permanent magnet synchronous motor and the rotor absolute angular position of the permanent magnet synchronous motor;

generating a fundamental d-axis voltage command based on a difference between a d-axis current command and the d-axis current feedback signal and a fundamental q-axis voltage command based on a difference between a q-axis current command, which is calculated based on the torque command, and the q-axis current feedback signal;

generating a harmonic suppression d-axis voltage command and a harmonic suppression q-axis voltage command for suppressing at least one higher-order harmonic current component included in a harmonic current component;

generating a d-axis voltage command by adding the fundamental d-axis voltage command and the harmonic suppression d-axis voltage command and a q-axis voltage command by adding the fundamental q-axis voltage command and the harmonic suppression q-axis voltage command;

transforming the q-axis voltage command and the d-axis voltage command into three-phase voltage commands; and outputting a drive voltage for driving the permanent magnet synchronous motor based on the three-phase voltage commands.

8. The method as set forth in claim 7, wherein the step of generating the harmonic suppression d-axis voltage command and the harmonic suppression q-axis voltage command comprises the steps of:

calculating a fifth harmonic suppression d-axis voltage command and a fifth harmonic suppression q-axis voltage command which are used to suppress a fifth harmonic current component of the harmonic current component;

calculating a seventh harmonic suppression d-axis voltage command and a seventh harmonic suppression q-axis voltage command which are used to suppress a seventh harmonic current component of the harmonic current component; and calculating the harmonic suppression d-axis voltage command by adding the fifth harmonic suppression d-axis voltage command and the seventh harmonic suppression d-axis voltage command; and calculating the harmonic suppression q-axis voltage command by adding the fifth harmonic suppression q-axis voltage command and the seventh harmonic suppression q-axis voltage command.

9. The method as set forth in claim 7, wherein the step of calculating the fifth harmonic suppression d-axis and q-axis voltage commands comprises the steps of:

transforming the harmonic current component into components in a fifth coordinate system;

extracting a direct current component of the fifth harmonic current component by filtering the components in the fifth coordinate system using a low pass filter; and calculating a voltage command for causing the extracted direct current component to be zero using a proportional integration controller; and calculating the fifth harmonic suppression d-axis and q-axis voltage commands by transforming the voltage command into that in a fundamental wave coordinate system.

10. The method as set forth in claim 7, wherein the step of calculating the seventh harmonic suppression d-axis and q-axis voltage commands comprises the steps of:

transforming the harmonic current component into components in a seventh coordinate system;

extracting a direct current component of the seventh harmonic current component by filtering the components in the seventh coordinate system using a low pass filter;

calculating a voltage command for causing the extracted direct current component to be zero using a proportional integration controller; and calculating the seventh harmonic suppression d-axis and q-axis voltage commands by transforming the voltage command into that in a fundamental wave coordinate system.

11. The method as set forth in claim 7, wherein the harmonic current component is calculated based on differences between the d-axis and q-axis current feedback signals and the d-axis and q-axis current commands.

12. A system for controlling a permanent magnet synchronous motor, comprising:

means for generating a torque command based on a difference between an angular velocity command and a rotor angular velocity calculated based on a rotor absolute angular position of the permanent magnet synchronous motor;

means for generating a q-axis current command and a d-axis current command corresponding to the torque command;

means for generating a d-axis current feedback signal and a q-axis current feedback signal based on a drive current applied to the permanent magnet synchronous motor and the rotor absolute angular position;

means for generating a fundamental d-axis voltage command and a fundamental q-axis voltage command, a harmonic suppression d-axis voltage command and a harmonic suppression q-axis voltage command which are used to suppress at least one higher-order harmonic current component included in a harmonic current component, and generating a d-axis voltage command by adding the fundamental d-axis voltage command and the harmonic suppression d-axis voltage command and a q-axis voltage command by adding the fundamental q-axis voltage command and the harmonic suppression q-axis voltage command;

means for transforming the q-axis voltage command and the d-axis voltage command into three-phase voltage commands; and means for outputting a drive voltage for driving the permanent magnet synchronous motor based on the three-phase voltage commands.

13. The system as set forth in claim 12, wherein the means for generating the fundamental d-axis voltage command and the fundamental q-axis voltage command calculates a fifth harmonic suppression d-axis voltage command and a fifth harmonic suppression q-axis voltage command, which are used to suppress a fifth harmonic current component of the harmonic current component, and a seventh harmonic suppression d-axis voltage command and a seventh harmonic suppression q-axis voltage command, which are used to suppress a seventh harmonic current component of the harmonic current component; and generates the harmonic suppression d-axis voltage command by adding the fifth harmonic suppression d-axis voltage command and the seventh harmonic suppression d-axis voltage command and the harmonic suppression q-axis voltage command by adding the fifth harmonic suppression q-axis voltage command and the seventh harmonic suppression q-axis voltage command.

14. The system as set forth in claim 13, wherein the means for generating the fundamental d-axis voltage command and the fundamental q-axis voltage command transforms the harmonic current component into components in a fifth coordinate system, extracts a direct current component of a fifth harmonic current component by filtering the components in the fifth coordinate system using a first low pass filter, calculates a first voltage command for causing the extracted direct current component to be zero using a proportional integration controller, and calculates the fifth harmonic suppression q-axis and d-axis voltage commands by transforming the first voltage command into that in a fundamental wave coordinate system; and transforms the harmonic current component into components in a seventh coordinate system, extracts a direct current component of a seventh harmonic current component by filtering the components in the seventh coordinate system using a second low pass filter, calculates a second voltage command for causing the extracted direct current component to be zero using the proportional integration controller, and calculates the seventh harmonic suppression q-axis and d-axis voltage commands by transforming the second voltage command into that in the fundamental wave coordinate system.

15. The system as set forth in claim 12, wherein the d-axis current command is zero.

16. The system as set forth in claim 12, wherein the harmonic current component is calculated based on differences between the d-axis and q-axis current feedback signals and the d-axis and q-axis current commands.

17. The system as set forth in claim 12, wherein the fundamental d-axis voltage command is based on a difference between the d-axis current command and the d-axis current feedback signal and the fundamental q-axis voltage command is based on a difference between the q-axis current command and the q-axis current feedback signal.

* * * * *